3,303,034
PLASTIC REFRACTORY
Peter T. Troell, 1701 Parkline Drive, Pittsburgh, Pa. 15227, and George L. Winchester, 5031 New Castle Road, Raleigh, N.C. 27606
No Drawing. Filed Jan. 21, 1966, Ser. No. 522,073
2 Claims. (Cl. 106—65)

This application is a continuation-in-part of application Serial Number 347,707, filed February 27, 1964, and now abandoned.

This invention relates to consolidated refractory compositions that have been rendered plastic and workable by mixing with tempering fluid and which remain plastic and are suitable for installation by ramming techniques even after an extensive storage period.

The use of phosphoric acid in combination with aluminous materials to promote an aluminum phosphate bond has heretofore been used to provide green and fired strength in refractory compositions. A problem arises when it is desired to make a phosphoric acid monolithic refractory which must have a certain storage or shelf life, particularly those monoliths termed plastic ramming mixes. The crude clays employed heretofore to impart workability to the material reacted with the phosphoric acid thus rendering the material unworkable.

Accordingly, it is an object of this invention to provide improved, phosphate bonded, consolidated, refractory plastics having particular utility for installation by refractory ramming techniques.

It is another object of the invention to provide improved, shaped refractory plastics having long storage or shelf life.

Other objects of the invention will be apparent hereinafter.

Briefly, in accordance with one embodiment of the present invention, there is provided a consolidated but plasitc refractory mixture which is particularly suited for installation by refractory ramming techniques. The mixture consists of about from 1 to 10% of bentonite and the balance is a calcined aluminous material preferably selected from the group tabular alumina, bauxite, kyanite, and diaspore. The mix may also contain, if desired, up to 15%, by weight, of calcined alumina. It is a high purity material (99% $Al_2O_3$ on an oxide basis) and is commercially marketed in a finely divided state (—325 mesh). The mixture is treated with a tempering agent, such as, water and concentrated phosphoric acid in an amounts to provide $P_2O_5$ equivalent to that provided by about 2 to 15%, by weight, of 85% phosphoric acid.

The term "consolidated refractory mixture" refers to a mixture which has been extruded, pressed, rammed or the like.

In a preferred embodiment, the bentonite is present in an amount of from 3 to 5%, by weight, and contains from about 2 to 3% of $Na_2O$ (by weight, on an oxide basis) this material is referred to in the art as Wyoming bentonite. A feature of the present invention is that bentonite, as a plasticizer is less reactive with phosphoric acid in contrast to plasticizers previously employed in the prior art. Accordingly, consolidated aluminous refractories blended with phosphoric acid and bentonite may be stored for at least a six month period and yet retain sufficient workability for installation by ramming techniques.

The aluminous materials bauxite, kyanite, tabular alumina, and diaspore are generally regarded as inert materials, that is, they will not react to any great extent with phosphoric acid at room temperature. The reaction of these materials with phosphoric acid is slow even at temperatures of about 150° F. unless a sufficient amount of fines are present. Accordingly, if from about 15 to 40% of the aluminous material specified be of —325 mesh particle size, this fraction will react rapidly and more completely with phosphoric acid upon heating to form aluminum phosphate and will bind the coarser particles to provide a monolithic structure. If the specified fraction constitutes more than 40%, a decrease in density and losses due to shrinkage may occur in the monolith. The coarse fraction of the batch should be about 40 to 60% +28 mesh. Any balance of the batch will, of course, be —28 +325 mesh.

Thus, the presence and quantity of —325 mesh calcined alumina employed in the batch is dependent upon the amount of the —325 mesh fraction present in the aluminous material specified. That is, the calcined alumina may be added to the batch, when necessary, to increase the —325 mesh fraction to within desirable limits. This addition would, in effect, eliminate continuous millng of the alumnous material. We suggest that a total of from about 15% to 30% of —325 mesh aluminous material, or calcined alumina, or a combination of both, be present.

Broadly, then, sizing is as follows:

| | Percent |
|---|---|
| +28 mesh | 40 to 60 |
| —325 mesh | 15 to 40 |
| —28 +325 | 0 to 45 |

The following examples are illustrative of the practice of this invention. All parts and percentages are, by weight; all chemical analyses are on the basis of an oxide analysis, in conformity with the general practice of reporting the chemical analyses of refractory materials. All size grading or mesh indications are according to the standard Tyler series. All determinations of workability index are in accordance with the standard method of testing fireclay plastic, ASTM designation C181–47.

*Example I*

About 80%, by weight, of —4 mesh calcined South American bauxite (89% $Al_2O_3$), about 15% of —325 mesh calcined alumina (99+% $Al_2O_3$), about 5% ball clay and about 10% of 85% phosphoric acid were intimately mixed in a Clearfield mixer for 5 minutes, then for an additional 5 minutes with about 6% water. The workability index of the mix was determined according to the above identified standard ASTM procedure. The results are indicated below.

| | |
|---|---|
| As made | 41 |
| After 3 months | 9.1 |
| After 6 months, unworkable. | |
| Percent loss in workability after 3 months | 78 |

The ball clay was substantially all —100 mesh and analyzed about 61% $SiO_2$, about 35% $Al_2O_3$, about 2% $TiO_2$, about 1% $Fe_2O_3$, the remainder being CaO, MgO, and alkalies.

*Example II*

Another batch was prepared containing about 75% of calcined South American bauxite, about 15% of —325 mesh calcined alumina, about 10% of the ball clay employed in Example I, and about 14% of 85% phosphoric acid. The batch was mixed thoroughly and the workability index determined as in Example I. The results are tabulated below.

| | Percent |
|---|---|
| As made | 56.6 |
| After 3 months | 8.7 |
| After 6 months, unworkable. | |
| Percent loss in workability after 3 months | 84.5 |

Example III

Another batch was prepared containing about 70% of calcined South American bauxite, about 15% of −325 mesh calcined alumina, about 15% of the ball clay employed in Example I, and about 16% of 85% phosphoric acid. The batch was intimately mixed and the workability determined as in Example I. The results are tabulated below.

| | Percent |
|---|---|
| As made | 45.4 |
| After 3 months | 7.6 |
| After 6 months, unworkable. | |
| Percent loss in workability after 3 months | 83 |

Example IV

Another batch was prepared in the same manner as Example I and the workability index was determined. The batch contained about 95% of calcined South American bauxite, about 5% of −325 mesh Wyoming bentonite and was mixed with about 10% of 85% phosphoric acid. About 16% of the bauxite was −325 mesh. The results are tabulated below.

| | Percent |
|---|---|
| As made | 54.2 |
| After 3 months | 23.6 |
| After 6 months | 17.2 |
| Percent loss in workability after 3 months | 56 |

Example V

A batch was prepared similar in manner to the previous examples and the workability index was determined. The batch contained 82% of calcined South American bauxite, about 15% of −325 mesh calcined alumina, about 3% of −325 mesh Wyoming bentonite, and was mixed with about 10% of 85% phosphoric acid. About 8% of the bauxite was −325 mesh. The results are tabulated below.

| | Percent |
|---|---|
| As made | 34.4 |
| After 3 months | 13.5 |
| After 6 months | 9.8 |
| Percent loss in workability after 3 months | 60 |

Example VI

Another batch was prepared identical in all respects to the batch of Example V except that 8% of phosphoric acid was mixed with the batch. The workability index was determined and is indicated below.

| | Percent |
|---|---|
| As made | 31.2 |
| After 3 months | 15.7 |
| After 6 months | 14.8 |
| Percent loss on workability after 3 months | 50 |

The overall size grading of all the batches of the above examples was typically as follows:

| | Approximate ±5, percent |
|---|---|
| Held on 10 mesh | 30 |
| Pass 10, held on 28 | 20 |
| Pass 28, held on 65 | 10 |
| Pass 65 mesh | 40 |
| Pass 325 mesh | 20 |

It should be understood that the above sizing is only exemplary for the mixes set forth. In accordance with the broad aspects of the invention the batches can be sized as above, gap sized, etc., as long as the overall sizing of the batch is about 15 to 40% −325 mesh and about 40 to 60% +28 mesh.

A comparison of the examples and in particular the tabulations of workability index establishes that the use of bentonite as opposed to ball clay appreciably enhances the storage or shelf life of the consolidated mixes. For example, Example I and Example V show quite similar materials mixtures, except for the substitution of Wyoming bentonite for ball clay. However, where the former was unworkable after six months storage, the latter was still usable.

Having thus described the invention in detail and with sufficient particularity as to enable those skilled in the art to practice it, what is desired to have protected by Letters Patent is set forth in the following claims.

We claim:

1. A consolidated, plastic-refractory-size-graded ramming mixture that is suitable for installation by ramming techniques after storage periods of up to six months consisting essentially of, by weight, from 1 to 10% of bentonite containing about 2 to 3% $Na_2O$, up to 15% calcined alumina, and the balance a calcined aluminous material selected from the group consisting of tabular alumina, bauxite, kyanite, and diaspore, from 15 to 40% of the total aluminous material and calcined alumina being sized to pass a 325 mesh screen, said mixture being treated with a tempering agent and phosphoric acid in an amount to provide $P_2O_5$ equivalent to that provided by about 2 to 15%, by weight, of 85% phosphoric acid, from 40–60% of the batch being +28 mesh.

2. In phosphate bonded, consolidated, plastic-refractory-size-graded mixtures suitable for installation by ramming techniques consisting of aluminous materials and phosphoric acid in an amount to provide $P_2O_5$ equivalent to that provided by about 2 to 15%, by weight, of 85% phosphoric acid, the improvement consisting of from 1 to 10%, by weight, bentonite containing about 2 to 3% $Na_2O$ in the mixture and from about 15 to 40% of the aluminous material being sized to pass a 325 mesh screen, said −325 mesh aluminous material being selected from the group consisting of calcined tabular alumina, calcined bauxite, calcined kyanite, calcined diaspore and calcined alumina.

References Cited by the Examiner

UNITED STATES PATENTS 3,179,526   4/1965   Dolph _____ 106—65

TOBIAS E. LEVOW, *Primary Examiner.*

J. E. POER, *Assistant Examiner.*